United States Patent [19]

Pocci

[11] Patent Number: 5,319,860
[45] Date of Patent: Jun. 14, 1994

[54] MEASURING INSTRUMENT

[76] Inventor: Silvano Pocci, 9 Eric Dr., Kinnelon, N.J. 07405

[21] Appl. No.: 41,851

[22] Filed: Apr. 2, 1993

[51] Int. Cl.$^5$ .......................... G01B 5/08; G01B 5/12; G01B 5/18
[52] U.S. Cl. ...................................... 33/797; 33/542; 33/836; 33/558.01
[58] Field of Search ............... 33/709, 783, 792, 794, 33/795, 797, 798, 799, 800, 801, 802, 808, 836, 833, 832, 548, 555.1, 558.01, 558.03, 558.04, 558.3, 558.4, 558.5, 542, 544, 544.2, 542.1, 551

[56] References Cited

U.S. PATENT DOCUMENTS

| | | | |
|---|---|---|---|
| 111,892 | 2/1871 | Williams | 33/548 |
| 608,183 | 8/1898 | Davis | 33/797 |
| 2,339,720 | 1/1944 | Smith | 33/709 |
| 2,541,821 | 2/1951 | Kneissler | 33/709 |
| 3,081,548 | 3/1963 | Schwartz | 33/797 |
| 3,225,447 | 12/1965 | Bryant | 33/792 |
| 4,982,505 | 1/1991 | Pocci | 33/542 |
| 5,171,248 | 12/1992 | Ellis | 33/558.4 |

FOREIGN PATENT DOCUMENTS

| | | | |
|---|---|---|---|
| 0821717 | 12/1937 | France | 33/797 |
| 0192801 | 11/1982 | Japan | 33/783 |
| 0144996 | 1/1962 | U.S.S.R. | 33/792 |
| 0019279 | 6/1911 | United Kingdom | 33/797 |

*Primary Examiner*—Thomas B. Will
*Attorney, Agent, or Firm*—Alfred C. Hill

[57] ABSTRACT

An instrument for the simultaneous measurement of a diameter of and a lateral distance along a work piece comprises a first member having a longitudinal track therein; a second member secured to one end of the first member having a reference surface for the lateral distance measurement, the reference surface being positioned against an end of the work piece from which the lateral distance is to measured; a third member disposed in the track slideable longitudinally therein; a pair of arms mounted in a pincer-like fashion on the third member and extending through the second member to enable measuring the diameter and the lateral distance from the reference surface of a given portion of the work piece; a first arrangement coupled to the third member and one of the pair of arms to obtain a first readout of the lateral distance from the reference surface of the given portion of the work piece; and a second arrangement coupled to the first arrangement and the other of the pair of arms to obtain a second readout of the diameter of the given portion of the work piece.

20 Claims, 2 Drawing Sheets

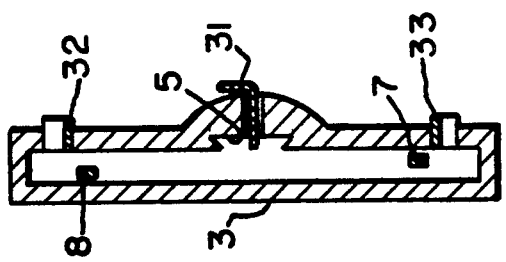
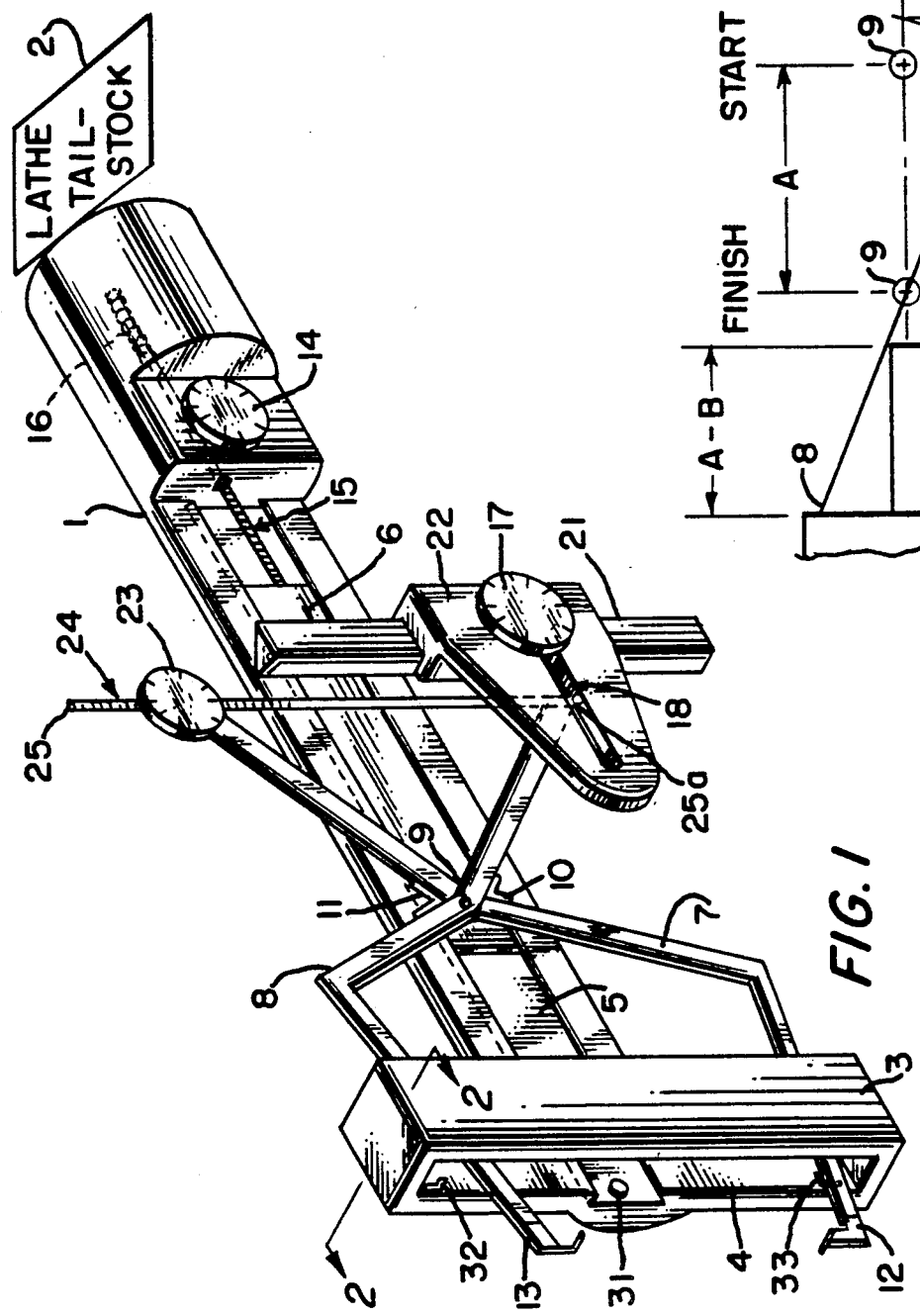

MEASURING INSTRUMENT

BACKGROUND OF THE INVENTION

The present invention relates to measuring instruments in general and more particularly to an instrument for the simultaneous measurement of a diameter of and a lateral distance along a work piece.

During the manufacture of mechanical parts by lathes or other machine tools it is necessary to measure the dimensions of the work piece, such as the diameter thereof and the lateral distance from a given end of the work piece to a shoulder formed therein. It is also necessary to use a measuring instrument for the inspection of these dimensions to make sure that predetermined tolerances are met. In the past, the internal and external diameter of surfaces of a work piece and the lateral distance along the work piece have been measured by calipers, micrometers and rulers which requires patience and is time consuming, since each diameter measurement and each lateral distance measurement must be made separately.

SUMMARY OF THE INVENTION

An object of the present invention is to provide an improved measuring instrument that reduces the time necessary to measure the diameter of and the lateral distance along a work piece.

Another object of the present invention is to provide an instrument for the simultaneous measurement of a diameter of and a lateral distance along a work piece.

Still another object of the present invention is the provision of a measuring instrument that will improve the quality control of the machining of mechanical parts or work pieces.

A feature of the present invention is the provision of an instrument for the simultaneous measurement of a diameter of and a lateral distance along a work piece comprising a first member having a longitudinal track therein; a second member secured to one end of the first member having a reference surface for the lateral distance measurement, the reference surface being positioned against an end of the work piece from which the lateral distance is to be measured; a third member disposed in the track slideable longitudnally therein; a pair of arms mounted in a pincer-type fashion on the third member and extending through the second member to enable measuring the diameter and the lateral distance from the reference surface of a given portion of the work piece; first means coupled to the third member and one of the pair of arms to obtain a first readout of the lateral distance from the reference surface of the given portion of the work piece; and second means coupled to the third member and the other of the pair of arms to obtain a second readout of the diameter of the given portion of the work piece.

BRIEF DESCRIPTION OF THE DRAWING

Above-mentioned and other features and objects of the present invention will become more apparent by reference to the following description taken in conjunction with the accompanying drawing, in which:

FIG. 1 is a perspective view of the measuring instruments inaccordance with the principle of the present invention;

FIG. 2 is a cross-sectional view taken along line 2—2 of FIG. 1;

FIG. 3 is a diagram illustrating the formula employed in obtaining the actual, precise lateral distance measurement along a work piece;

DESCRIPTION OF THE PREFERRED EMBODIMENTS

Figure 4:
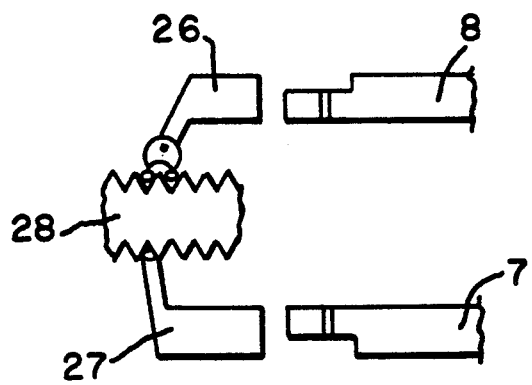
FIG. 4 is a plan view of different tips for the measuring arms interchangeable with those tips of FIG. 1.

Referring the FIG. 1, there is illustrated therein a perspective view of the measuring instrument inaccordance with the principles of the present invention to enable the simultaneous measurement of a diameter of and a lateral distance along a work piece. The measuring instrument includes a first member or main body 1 that can be mounted in a lathe tail-stock 2 or can be hand held. A second member 3 is secured to an end of member 1 having a reference surface 4 for the lateral distance measurement. In operation reference surface 4 is positioned against an end of the work piece from which the lateral distance is to be measured. First member 1 includes therein a track 5 which extends into member 3. A third member 6 is longitudinally slideable in track 5. A pair of measuring arms 7 and 8 are mounted to member 6 in a pincer-like fashion to pivot around pivot point 9. Arms 7 and 8 extend through member 3 to enable measuring the diameter of a work piece and the lateral distance along the work piece from reference surface 4 with the diameter and lateral distance measurement being performed on a given portion of the work piece. Springs 10 and 11 are provided between the pair of arms 7 and 8 to bias arms 7 and 8 toward each other so that when the diameter measurement is made there is no slack in arms 7 and 8, but rather a positive contact is provided between the interchangeable tips 12 and 13 and the work piece. A first means including dial indicator 14 and a rack and pinion arrangement 15, with rack 15 being spring loaded by spring 16, provides a readout indicating the distance that pivot point 9 has traveled when arms 7 and 8 move from reference surface 4 to the given portion of the work piece to make the lateral distance and diameter measurement. This readout is a part of the lateral distance measurement. Since the end of arm 8 travels in a arc as member 6 moves. This arc like-movement has to be accounted for to provide an accurate lateral distance measurement. This is accomplished by providing a dial 17 with a rack and pinion arrangement 18 connected to the adjacent end of arm 8 to provide a readout indicating the distance the end of arm 8 has moved in its arc when making the lateral distance and diameter measurement.

This method of obtaining actual measurement of the lateral distance is illustrated in FIG. 3 wherein the pivot point 9 moves a distance A from the start point to the finish point when measuring arm 8 is in contact with a given portion of the work piece to which the lateral distance is measured from reference surface 4. As illustrated in FIG. 3 the end of arm 8 moves in an arc 19 as pivot point 9 moves laterally from the start to the finish point. The distance B is that distance which the end of arm 8 has moved in its arc 19. The actual, precise lateral distance from reference surface 4 to the shoulder 20 on the work piece is obtained by subtracting the distance B from the distance A.

Continuing with the description of FIG. 1, dial 17 and rack and pinion arrangement 18 is slideably mounted on member 21 which is physically secured to member 6 for movement therewith. Dial 17 and rack and pinion arrangement 18 are carried by member 22 which is capable of sliding on member 21.

The end of arm 7 spaced from tip 12 is connected to a dial 23. Another rack and pinion arrangement 24, with the rack thereof formed on rod 25, operates dial 23 as arms 7 and 8 are moved to measure the diameter of a workpiece and dial 23 moves up or down in the rack portion of rack and pinion arrangement 24. End 25a of rod 25 is pivotably connected to rack and pinion arrangment 18 and the adjacent end of arm 8 so that rod 25 can move in an arc as arm 7 and 8 move to measure the diameter of the work piece and dial 23 moves up and down in the rack arrangement 24. Dial 23 provides a readout of the diameter of the work piece when tips 12 and 13 are biased in direct contact with the work piece in the given portion thereof.

While rack and pinion arrangements 15, 18 and 24 have been illustrated to convert linear motion to circular motion, any other mechanism to accomplish this linear to circular motion could be employed. In addition, dials 14, 17 and 23 which provide the visual readout could be replaced with digital indicators to provide a digital readout of the dimensions which would encompass therewith the ability to record these measurements for the purpose of providing data for statistical process control.

Figure 5:
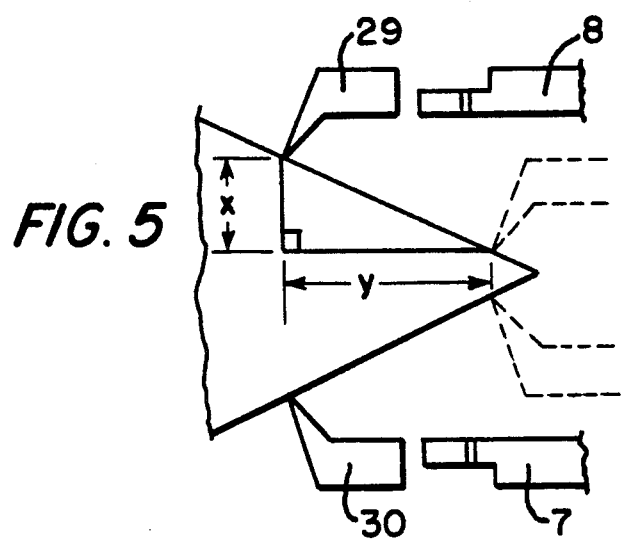
FIG. 5 is a plan view illustrating other tips for the measuring arms of FIG. 1 and another use for the measuring instrument of FIG. 1 inaccordance with the principles of the present invention.

As mentioned above the tips 12 and 13 on arms 7 and 8 can be removed and interchanged with other specialized tips, such as illustrated in FIGS. 4 and 5. As illustrated in FIG. 4, the specialized tips 26 and 27 provide a three wire system for determining the actual measurement of threads of the threaded work piece 28. As illustrated in FIG. 5, the specialized pointed tips 29 and 30 can be used to make any two readings of lateral distance and diameter to give the angle of the work piece through trigonometry.

Figure 6:
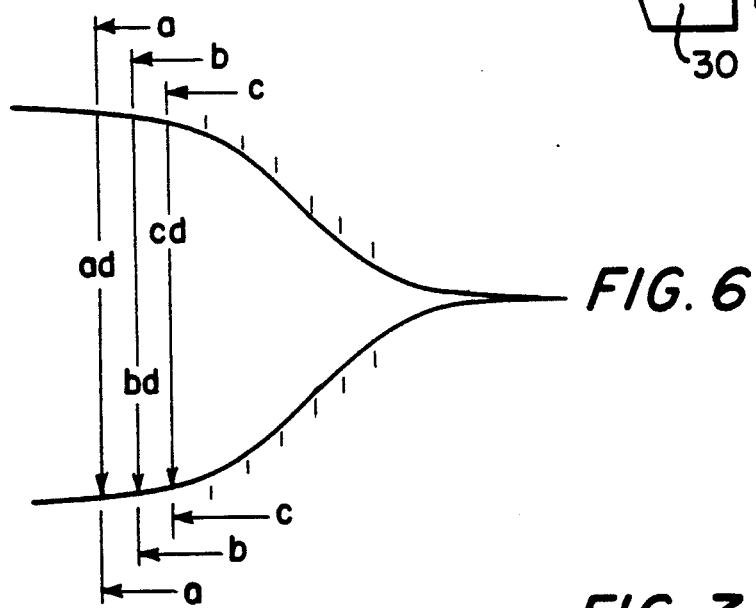
FIG. 6 is a plan view illustrating still another use for the measuring instrument of FIG. 1 inaccordance with the principles of the present invention.

Referring to FIG. 6, it is illustrated therein that any contour of a work piece can be plotted when an infinite number of lateral distances and diameters are obtained with the specialized tip similar to tips 29 and 30. Thus, any contour can be reproduced or duplicated when the infinite number of lateral distances and diameters are recorded and reproduced at a later time.

As illustrated in FIGS. 1 and 2, a stop 31 is provided in the track of member 3 to prevent member 6 from sliding out of track 5 unintentionally.

When arms 7 and 8 and their associated tips 12 and 13 are positioned within member 3 in a plane coincident with reference surface 4, the calibration of dials 14 and 17 to the zero start point for the lateral distance measurement is possible. When tips 12 and 13 of arms 7 and 8 are positioned to be in contact with one another, dial 23 can be calibrated to its zero point, and when tips 12 and 13 are placed on L-shaped members 32 and 33, it is possible to calibrate dial 23 for its maximum diameter readout.

Figure 7:
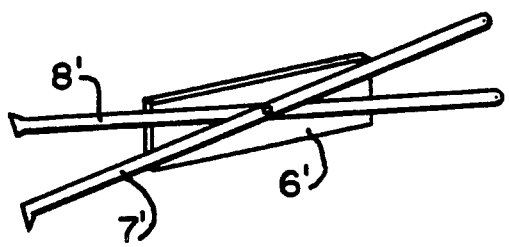
FIG. 7 is a perspective view of an alternative pair of arms employed in obtaining the internal diameter and lateral distance along a work piece inaccordance with the principles of the present invention.

As illustrated in FIG. 7, member 6' and its associated arms 7' and 8' can be substituted for member 6 and its associated arms 7 and 8 to provide measuring arms to measure the internal diameter of a work piece. This is accomplished by disconnecting arms 7 and 8 from their associated rack and pinion arrangements 18 and 24, disconnecting member 6 from its rack and pinion arrangement 15, pulling stop 31 to an outward position so that member 6 and arms 7 and 8, after being disconnected from their rack and pinion arrangements, can be slid out of track 5 and then replaced by member 6' and arms 7' and 8' which are reconnected to the appropriate ones of the rack and pinion arrangements 15, 18 and 24.

The measuring instrument of the present invention can be used in forming the work piece and in addition can be employed in inspection departments and has the ability to measure external diameters and the lateral distance from a reference surface to a given portion of a work piece, such as a shoulder machined thereon as well as internal diameters and the lateral distance from a reference point to internal shoulders that may be machined on the work piece. In addition, the measuring instruments of the present invention has interchangeable tips to enable measuring threads, angles and contours. The measuring instrument of the present invention replaces inside and outside calipers, vernier calipers, inside and outside micrometers and other depth measuring equipment.

Because of the ability of the measuring instruments of the present invention to be mounted directly upon the machinery involved in the manufacture of machined parts or work pieces all dimensions applicable to that operation can be visually verified.

More importantly, substitution of digital indicators for the dial indicators provides many additional benefits. The digital indicators can make a printed record of all the dimensions for each part. This printout can accompany each part to the final inspection department considerably reducing the need to reinspect each part. The printed readouts of all dimensions provide the necessary data which statistical process control systems require to function. Storage of the original digital printout tape provides a permanent record of the dimensional integrity of every part manufactured.

While I have described above the principles of my invention in connection with specific apparatus, it is to be clearly understood that this description is made only by way of example and not as a limitation to the scope of my invention as set forth in the objects thereof and in the accompanying claims.

I claim:

1. An instrument for the simultaneous measurement of a diameter of and a lateral distance along a work piece comprising:
   a first member having a longitudinal track therein;
   a second member secured to one end of said first member having a reference surface for said lateral distance measurement, said reference surface being positioned against an end of said work piece from which said lateral distance is to be measured;
   a third member disposed in said track slideable longitudinally therein;
   a pair of arms mounted in a pincer-like fashion on said third member and extending through said second member to enable measuring said diameter and said lateral distance from said reference surface of a give portion of said work piece;
   first means coupled to said third member and one of said pair of arms to obtain a first readout of said lateral distance from said reference surface of said given portion of said work piece; and second means coupled to said first means and the other of said pair of arms to obtain a second readout of said diameter of said given portion of said work piece.

2. An instrument according to claim 1, wherein said track extends into said second member and includes therein a removable stop to prevent said third member from exiting said track when said instrument is in operation.

3. An instrument according to claim 2, wherein said second member includes therein third means capable of being extended from an inner surface of said second member to enable calibrating said second means at a high end of said second readout by positioning measuring ends of said pair of arms on said third means.

4. An instrument according to claim 3, wherein said second means is calibrated at a lower end of said second readout by positioning said measuring ends of said pair of arms in contact with each other within said second member and in a plane coincident with said reference surface.

5. An instrument according to claim 4, wherein said first means is calibrated at a lower end of said first readout by positioning said measuring ends of said pair of arms in said plane coincident with said reference surface.

6. An instrument according to claim 5, wherein said measuring ends of said pair of arms include interchangeable tips enabling measuring said diameter and said lateral distance for different types of said work piece.

7. An instrument according to claim 6, wherein said first means includes
   a first readout means coupled to said third member to indicate a distance A moved by said third member when said pair of arms are moved to said given portion of said work piece, and
   a second readout means coupled to said third member and an adjacent end of said one of said pair of arms to indicate a distance B said adjacent end of said one of said pair of arms moves in an arc when said pair of arms are moved to said given portion of said work piece to measure said diameter thereof,
   said first readout being said lateral distance defined by A-B.

8. An instrument according to claim 7, wherein said second means includes
   a third readout means coupled to said first means and said other of said pair of arms to indicate the diameter of said given portion of said work piece.

9. An instrument according to claim 8, wherein said first readout means includes
   a first circular gauge coupled to said first member, and
   a first device coupled to said third member and said first gauge to convert linear motion of said third member to circular motion to cause said first gauge to indicate said distance A;
   said second readout means includes
      a second circular gauge coupled to said third member, and
      a second device coupled to said second gauge and said adjacent end of said one of said pair of arms to convert linear motion of said adjacent end of said one of said pair of arms to circular motion to cause said second gauge to indicate said distance B; and
   said third readout means includes
      a third circular gauge coupled to an adjacent end of said other of said pair of arms, and
      a third device coupled to said third gauge, said second device and said adjacent end of said one of said pair of arms to convert linear motion of said adjacent end of said other of said pair of arms to circular motion to cause said third gauge to indicate said diameter of said given portion of said work piece.

10. An instrument according to claim 9, wherein said first, second and third devices each include a rack and pinion mechanism.

11. An instrument according to claim 10, wherein said pair of arms are adaptable to measure external and internal diameters of said work piece.

12. An instrument according to claim 1, wherein said pair of arms includes interchangeable tips at the ends thereof adjacent said second member enabling measuring said diameter and said lateral distance of different types of said work piece.

13. An instrument according to claim 12, wherein said first means includes
   a first readout means coupled to said third member to indicate a distance A moved by said third member when said pair of arms are moved to said given portion of said work piece, and
   a second readout means coupled to said third member and an adjacent end of said one of said pair of arms to indicate a distance B said adjacent end of said one of said pair of arms moves in an arc when said pair of arms are moved to said given portion of said work piece to measure said diameter thereof,
   said first readout being said lateral distance defined by A-B.

14. An instrument according to claim 13, wherein said second means includes
   a third readout means coupled to said first means and said other of said pair of arms to indicate the diameter of said given portion of said work piece.

15. An instrument according to claim 14, wherein said first readout means includes
   a first circular gauge coupled to said first member, and
   a first device coupled to said third member and said first gauge to convert linear motion of said third member to circular motion to cause said first gauge to indicate said distance A;
   said second readout means includes
      a second circular gauge coupled to said third member, and
      a second device coupled to said second gauge and said adjacent end of said one of said pair of arms to convert linear motion of said adjacent end of said one of said pair of arms to circular motion to cause said second gauge to indicate said distance B; and
   said third readout means includes
      a third circular gauge coupled to an adjacent end of said other or said pair of arms, and
      a third device coupled to said third gauge, said second device and said adjacent end of said one of said pair of arms to convert linear motion of said adjacent end of said other of said pair of arms to circular motion to cause said third gauge to indicate said diameter of said given portion of said work piece.

16. An instrument according to claim 15, wherein said pair of arms are adaptable to measure external and internal diameters of said work piece.

17. An instrument according to claim 1, wherein said first means includes
- a first readout means coupled to said third member to indicate a distance A moved by said third member when said pair of arm are moved to said given portion of said work piece, and
- a second readout means coupled to said third member and an adjacent end of said one of said pair of arms to indicate a distance B said adjacent end of said one of said pair of arms moves in an arc when said pair of arms are moved to said given portion of said work piece to measure said diameter thereof, said first readout being said lateral distance defined by A-B.

18. An instrument according to claim 17, wherein said second means includes
- a third readout means coupled to said first means and said other of said pair of arms to indicate the diameter of said given portion of said work piece.

19. An instrument according to claim 18, wherein said pair of arms are adaptable to measure external and internal diameters of said work piece.

20. An instrument according to claim 1, wherein said pair of arms are adaptable to measure external and internal diameters of said work piece.

* * * * *